United States Patent
Tanaka

(10) Patent No.: US 6,876,150 B2
(45) Date of Patent: Apr. 5, 2005

(54) FLAT PLASMA DISPLAY PANEL AND METHOD OF PRODUCING THE SAME

(75) Inventor: Yukio Tanaka, Yamanashi (JP)

(73) Assignees: Pioneer Corporation, Tokyo (JP); Shizuoka Pioneer Corporation, Shizuoka (JP)

( * ) Notice: Subject to any disclaimer, the term of this patent is extended or adjusted under 35 U.S.C. 154(b) by 153 days.

(21) Appl. No.: 10/190,841

(22) Filed: Jul. 9, 2002

(65) Prior Publication Data

US 2003/0015963 A1 Jan. 23, 2003

(30) Foreign Application Priority Data

Jul. 19, 2001 (JP) ..................................... P 2001-219302

(51) Int. Cl.[7] .............................. H01J 17/49; H01J 9/26
(52) U.S. Cl. ........................ 313/582; 313/586; 313/587; 445/24; 445/25
(58) Field of Search ................................ 313/582–587; 445/24, 25

(56) References Cited

U.S. PATENT DOCUMENTS 5,846,110 A * 12/1998 Kanagu et al. ............... 445/25
5,892,492 A * 4/1999 Osawa et al. ................. 345/60
6,777,874 B2 * 8/2004 Nakatani et al. ............. 313/586

FOREIGN PATENT DOCUMENTS

JP 4-95331 * 3/1992 ............ H01J/17/49

* cited by examiner

Primary Examiner—Joseph Williams
Assistant Examiner—Sikha Roy
(74) Attorney, Agent, or Firm—Sughrue Mion, PLLC

(57) ABSTRACT

A display electrode and a dielectric layer are formed on the convex side of a front glass substrate that is convexly curved in profile, whereas address electrodes, a dielectric layer, partition walls and phosphor layers are formed on the convex side of a back glass substrate 15 that convexly curved in profile. Further, a sealing layer containing granular substances in a sealing material is formed in the peripheral portion of the back glass substrate. A front panel and a back panel are stacked so that the panel component parts of the front panel are set opposite to the panel component parts of the back panel. Then the peripheral portions of the panels are pressed against each other into a flat substrate plate as shown by arrows and heated up.

4 Claims, 2 Drawing Sheets

FLAT PLASMA DISPLAY PANEL AND METHOD OF PRODUCING THE SAME

BACKGROUND OF THE INVENTION

1. Field of the Invention

This invention relates to a plasma display panel formed by sealing up the peripheries of a pair of opposed substrates via discharge spaces held between the substrates with a sealing material and a method of producing the same.

2. Background Art

A plasma display panel (PDP) is formed by partitioning an airtight space between a pair of substrates into a plurality of discharge spaces in stripes or matrices, so that an image is displayed by selectively generating electric discharge in the plurality of discharge spaces.

FIG. 3 is a diagram illustrating the general structure of a plasma display panel, wherein reference numeral 1 denotes a front glass substrate having a display electrode 2, a dielectric layer 3, a protective layer 4 of such as MgO (magnesium oxide) and so on. Reference numeral 5 denotes a back glass substrate on which partition walls 6 are formed at predetermined intervals on a dielectric layer 9. The space formed between the front glass substrate 1 and the back glass substrate 5 is partitioned by the partition walls 6 into minute spaces which serve as discharge spaces. Address electrodes 7 and phosphor layers 8a, 8b and 8c for RGB colors are formed in the respective discharge spaces and further a neon-xenon mixed gas, for example, is also injected into the discharge spaces.

In the case of a plasma display panel like this, an image is displayed by applying voltage across the display electrode 2 and the address electrodes 7 so as to selectively cause each of the phosphor layers 8a, 8b and 8c formed on the inner surface of the discharge spaces to discharge and to emit light therefrom. In this case, a black stripe 10 corresponding to the surface of each partition wall 6 is formed on the back of the front glass substrate 1. In the example shown in FIG. 3, though the partition walls 6 are provided in the form of a well curb so as to arrange discharge spaces in matrices, there is also a method of providing discharge spaces in stripes by forming the partition walls 6 in parallel to each other.

A method of producing such a plasma display panel will be described. A front and a back panel are formed through the steps of successively forming the front-panel component parts including the display electrode 2, the dielectric layer 3 and the protective layer 4 on one side of the front glass substrate 1 and successively forming the back-panel component parts including the address electrodes 7, the partition walls 6 and the phosphor layers 8a, 8b and 8c on one side of the back glass substrate 5, the front and back panels being stacked up so that the panel component parts face one another. Further, the peripheral portions of the front glass substrate 1 and the back glass substrate 5 are sealed up with a sealing material and internal evacuation of the discharge spaces formed between the two sheets of substrates thus bonded together is carried out. Then a discharge gas is encapsulated in the discharge spaces and the whole structure is subjected to aging.

At the sealing step above, a sealing material made of fritted glass having a low melting point is applied by screen printing, in a frame-like figure, to the peripheral portion of the front glass substrate 1 or back glass substrate 5, or the peripheral portions of both the glass substrates 1 and 5. Then the sealing material is temporarily calcined to form a sealing layer and both the glass substrates 1 and 5 are stacked and subjected to heat treatment at about 400° C. while both the substrates are pressed against each other, whereby the space between both the glass substrates is sealed up as the sealing layer is softened and fusion-bonded.

During the process of producing the plasma display panel above, as pressure fluctuations resulting from the internal evacuation of the discharge spaces and the encapsulation of the discharge gas in the discharge spaces are caused to the structure of the panel in such a condition that the sufficient strength of the softened and fusion-bonded sealing layer remains unacquired after the heat treatment is made at the sealing step, there occurs a phenomenon of causing the end portions on the peripheries of the glass substrates to become curved, whereas in the substantially central portions of the glass substrates, there occurs a phenomenon of increasing the substrate-to-substrate space due to the pressure of encapsulated discharge gas.

FIG. 4 shows the above situation byway of example, wherein as a sealing material 20 contracts, the dimension of the space between the opposed glass substrates 1 and 5 becomes uneven in the substantially central portions of the glass substrates and this results in narrowing the space between the peripheral portions thereof. In the plasma display panel, though a uniform space has to be set between the glass substrates 1 and 5 so as to obtained desired characteristics, the problem is that the desired display characteristics remain unobtainable in the situation shown in FIG. 4.

In such a situation that the glass substrates 1 and 5 are warped when the sealing material 20 contracts as shown in FIG. 4, the curving of the glass substrates causes the display quality to lower and there is produced a gap G between the partition walls 6 and the front panel and the problem in this case is that an abnormal sound of about 10 kHz is generated because that gap portion vibrates when the panel is driven.

Heretofore, a glass or plastic substrate 30 has been arranged as a sound insulating member over the front glass substrate 1 to counter the generation of the abnormal sound. Further, an optical film 31 serving as an electromagnetic-wave cutting off layer for cutting off an electromagnetic wave leaking out from a plasma display panel, an infrared-ray absorbing layer for absorbing an infrared ray emitted from the plasma display panel or an external-light reflection preventive layer for preventing the external light from being reflected have been bonded onto the substrate 30. However, the provision of the substrate 30 has raised the problem of not only increasing the number of parts but also impeding an attempt to reduce the thickness of the panel.

SUMMARY OF THE INVENTION

An object of the invention proposed to deal with the forgoing problems is to provide a plasma display panel intended to make obtainable desired display characteristics and display quality by uniformizing the space between glass substrates and to prevent the generation of an abnormal sound when the panel is driven without providing a sound insulating member.

In order to accomplish the object above, the invention features the following.

A plasma display panel according to a first aspect of the invention comprises: a front and a back substrate which face each other with a discharge space formed between the front and back substrates, the peripheral portions of both the substrates being sealed up with a sealing material; and partition walls for use in defining the dimension of the space formed therebetween and partitioning the space into a plurality of discharge spaces, wherein the sealing material contains granular substances having a melting point higher than that of the sealing material and having an outer diameter ranging from what is substantially equal to the dimension of the space and wherein in both cases where the front and back substrates are convexly curved in profile and where one of the front and back substrates is convexly curved in profile, the front and back substrates are reduced to a flat plate by pressing one convex substrate against the other substrate and sealing up the peripheral portions of both the substrates with the sealing material.

According to a third aspect of the invention, a method of producing a plasma display panel comprising: a front and a back substrate which face each other with a discharge space formed between the front and back substrates, the peripheral portions of both the substrates being sealed up with a sealing material; and partition walls for use in defining the dimension of the space formed therebetween and partitioning the space into a plurality of discharge spaces, comprises the steps of: forming a front panel by forming panel component parts on the convex side of the convexly curved front substrate; forming a back panel by forming panel component parts including partition walls on the convex side of the convexly curved back substrate; stacking the front and back panels so that the respective panel component parts face one another and reducing both the substrates to a flat plate by pressing one substrate against the other substrate and sealing up the peripheral portions of both the substrates with the sealing material containing granular substances having a melting point higher than that of the sealing material and having an outer diameter ranging from what is substantially equal to the dimension of the space.

According to a fourth aspect of the invention, a method of producing a plasma display panel includes the step of directly bonding an optical film onto the front side of the front substrate with an adhesive material.

These aspects of the invention performs the following functions:

The plasma display panel according to the first aspect of the invention or the method of producing the same according to the third aspect of the invention is such that the sealing material contains, for example, spherical or columnar granular substances having a melting point higher than that of the sealing material and a dimension substantially equal to the gap dimension of each discharge space, whereby the substrate-to-substrate space in the peripheral portions can be regulated even though the sealing material is softened, with the effect of restraining the peripheral portions of the glass substrates from being curved.

The use of the substrates having the convexly curved surfaces where the panel component parts are respectively formed results in pressing the front substrate against the partition walls in the vicinity of the center of the front substrate when the front substrate is bonded onto the back substrate. Moreover, as both the substrates are sealed up with the space regulated by the outer diameter of the granular substances in the peripheral portion of the substrates, the front and back substrates are made parallel flat substrates having a uniform space after being sealed up.

Therefore, the dimension of the subsrate-to-subsrate space can precisely be set up, so that a plasma display panel having desired display characteristics. Since the substrates are ultimately prevented from being curved, good display quality can be secured. Further, the substrate is bonded onto the partition walls while it is being pressed there against, no gap is produced between the substrate and the partition walls, whereby the generation of an abnormal sound is prevented when the panel is driven.

The plasma display panel according to the second aspect of the invention or the method of producing the same according to the fourth aspect of the invention makes it possible to prevent the generation of the abnormal sound when the panel is driven and the provision of a glass or plastic substrate as a sound insulating member can be dispensed with, whereby the optical film can directly be bonded onto the front substrate. Consequently, a reduction in the thickness, weight and cost of the panel is also realizable.

DETAILED DESCRIPTION OF THE PREFERRED EMBODIMENTS

Figure 1:
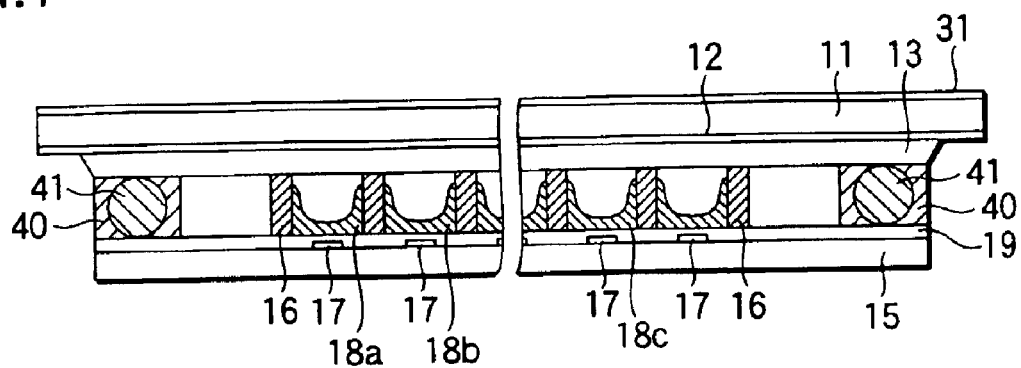
FIG. 1 is a diagram illustrating the sectional structure of a plasma display panel embodying the invention.

An embodiment of the invention will now be described with reference to the drawings. FIG. 1 is a diagram illustrating the sectional structure of a plasma display panel embodying the invention. A display electrode 12 made up of a transparent electrode such as ITO and a bus electrode (not shown) that is provided in parallel to the display electrode 12 and used for lowering the line resistance of the display electrode 12 are formed on a front glass substrate 11. A dielectric layer 13 is formed on the further inside of the front glass substrate.

On the back glass substrate 15, a dielectric layer 19 is provided on address electrodes 17 for use in writing and partition walls 16 for making discharge spaces are provided in the form of stripes or a well curb. On the inside of each discharge space thus formed, one of the phosphor layers 18a, 18b and 18c of three R, G and B colors for the emission and coloring of visible light is laid, the phosphor layers 18a, 18b and 18c being disposed in a well-regulated manner.

The front glass substrate 11 and the back glass substrate 15 are bonded together with a sealing layer 40. Then not solely internal evacuation of the space between the two sheets of glass substrates 11 and 15 thus bonded together but also the encapsulation of a discharge gas in the space is carried out and module parts such as a driver IC (not shown) are mounted thereon so as to form the plasma display panel.

In this case, the front glass substrate 11 and the back glass substrate 15 are convexly curved in profile and the parallel flat glass substrates 11 and 15 are ultimately formed by pressing the convex sides of the substrates against each other and bonding the convex sides thereof together.

The sealing layer 40 contains granular substances 41 having a melting point higher than that of fritted glass as a sealing material having a low melting point and having an outer diameter ranging from what is substantially equal to the dimension of the space between the opposed glass substrates 11 and 15 up to what is about five times greater than the dimension of the space formed therebetween (i.e., an outer diameter ranging from what is substantially equal to the height of the partition wall 16 defining the gap dimension of the discharge space in the display area up to the what is about five times greater than the height of the partition wall 16). The granular substances 41 may be spherical or columnar glass beads, for example.

Further, an optical film 31 is directly bonded onto the front side of the front glass substrate 11 with an adhesive material. The optical film 31 is in the form of a single layer selected from the group of or a multilayer comprising an electromagnetic-wave cutting off layer for cutting off an electromagnetic wave leaking out from the plasma display panel, an infrared-ray absorbing layer for absorbing an infrared ray emitted from the plasma display panel and an external-light reflection preventive layer for preventing the external light from being reflected.

Figure 2A:
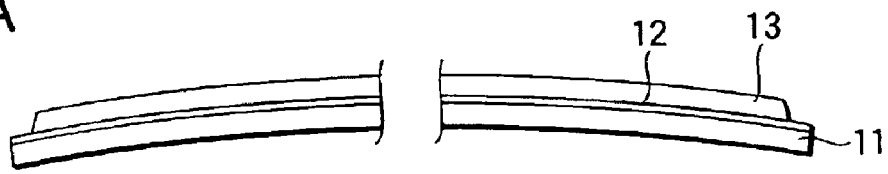
FIG. 2A is a diagram illustrating a method of producing the plasma display panel according to the embodiment of the invention.
Figure 2B:
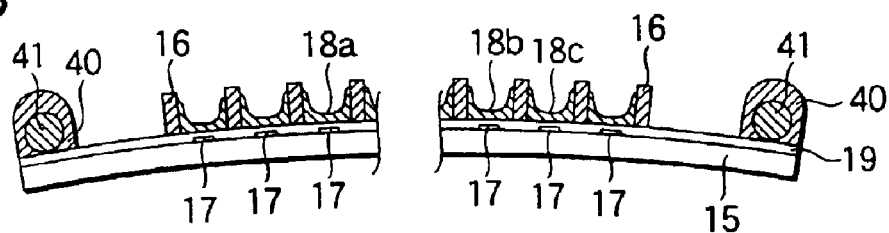
FIG. 2B is a diagram illustrating the method of producing the plasma display panel.

A method of producing the plasma display panel will be described with reference to FIGS. 2A–2C. As shown in FIG. 2A, the display electrode 12 (including the bus electrode), the dielectric layer 13 and an MgO layer as a protective layer, if necessary, are formed on the convexly curved surface of the front glass substrate 11 (the step of forming the front panel). Simultaneously, as shown in FIG. 2B, the address electrodes 17, the dielectric layer 19 (an electrode protective layer), the partition walls 16 and the phosphor layers 18(a), 18(b) and 18(c) (the step of forming back panel) are formed on the convexly curved surface of the back glass substrate 15.

Further, the frame-like sealing layer 40 is formed in the peripheral portion of the convex surface of the back glass substrate 15. As stated above, the sealing layer 40 contains the granular substances 41 having a melting point higher than that of fritted glass as a sealing material having a low melting point and having an outer diameter substantially equal to the dimension of the space between the opposed glass substrates 11 and 15 (i.e., an outer diameter substantially equal to the height of the partition wall 16 defining the gap dimension of the discharge space in the display area).

Figure 2C:
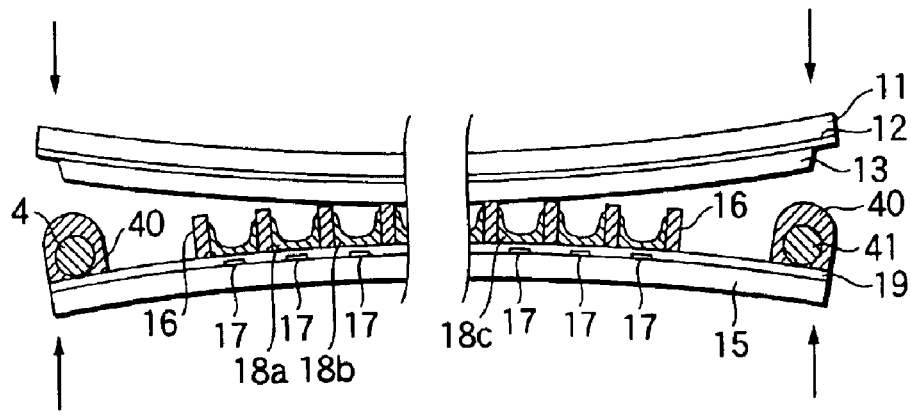
FIG. 2C is a diagram illustrating the method of producing the plasma.
Figure 3:
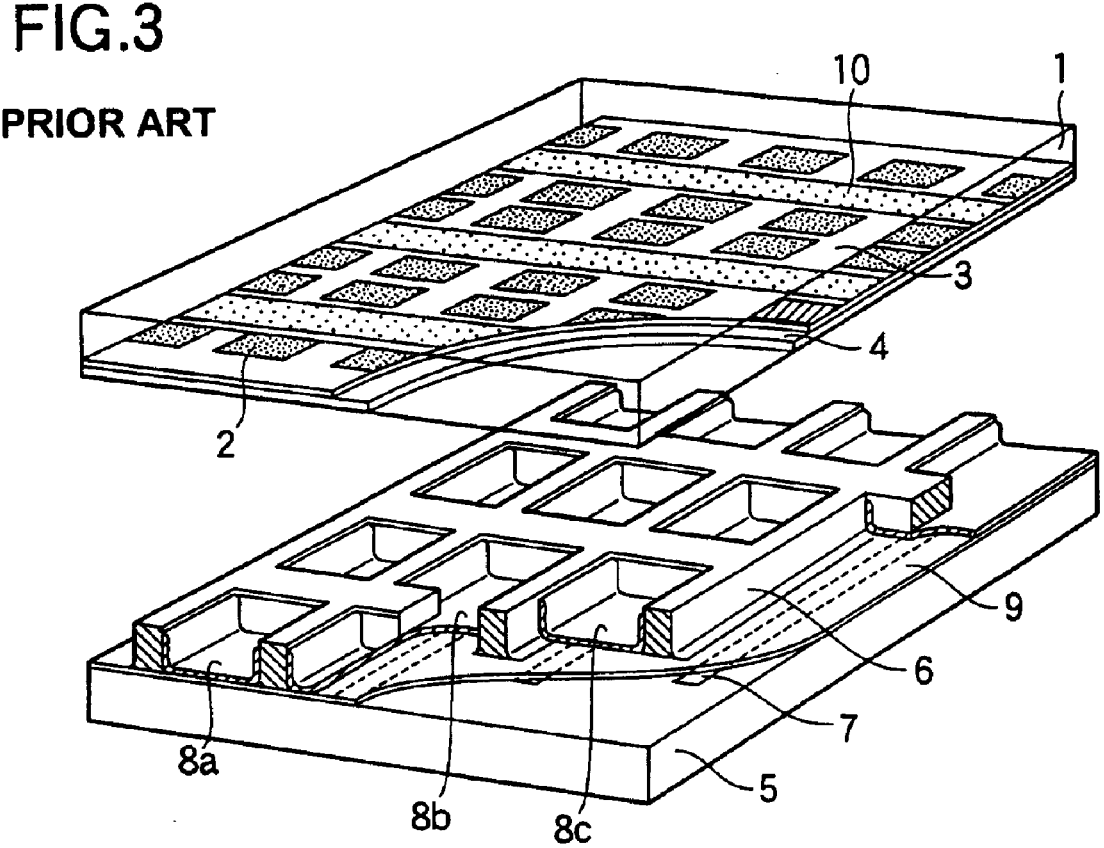
FIG. 3 is a diagram illustrating a conventional plasma display panel.

As shown in FIG. 2C, the front and back panel component parts (the front panel includes the display electrode 12, the dielectric layer 13 and so forth and the back panel includes the address electrodes 17, the dielectric layer 19 and the phosphor layers 18a, 18b and 18c) are stacked face to face. The peripheral portions of the panels are pressed against each other as shown by arrows to reduce the substrates a flat plate and then heated at about 400° C.

The convex side of the front panel near center of the front panel is pressed against the tops of the partition walls 16 at this step and in the peripheral portions of the panels, the substrates are reduced to the flat plate under pressure and the substrate-to-substrate space is regulated by the outer diameter of the granular substances 41 in the sealing material. While the pressurized condition is maintained, the sealing layer is softened and fusion-bonded and the pressurized condition is held until the fused layer is solidified as occasion demands.

As a result of the above steps thus taken, it can be accomplished to make the front glass substrate 11 and the back glass substrate 15 flat and after both the substrates are completely sealed up, the optical film 31 is bonded onto the front side of the front glass substrate.

According to this embodiment of the invention, the peripheral portions of the glass substrates 11 and 15 are restrained from being curved by the granular substances 41, so that the dimension of the space between the opposed glass substrates 11 and 15 can be set uniform over the whole substrate surface. Therefore, a plasma display panel having desired display characteristics is obtainable. Moreover, as the substrates are ultimately prevented from being curved, good display quality can be secured.

Figure 4:
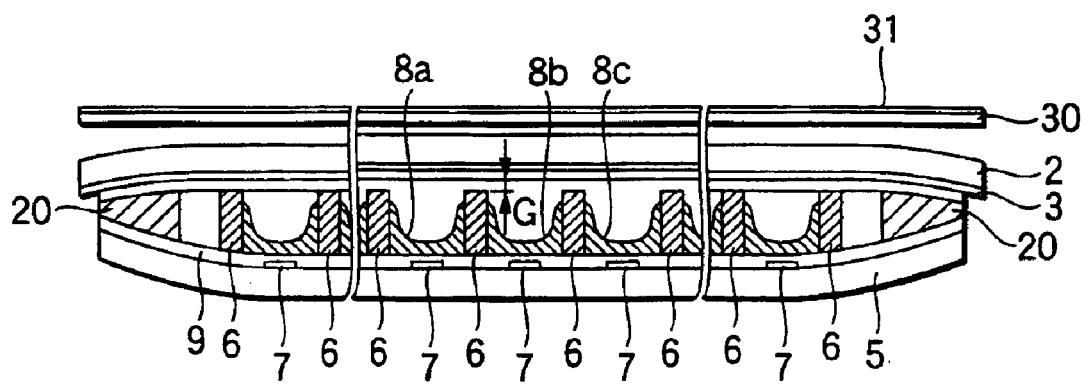
FIG. 4 is a diagram illustrating problems arising from the prior art.

Further, as the substrate is bonded onto the partition walls while it is being pressed thereagainst, no gap is produced between the substrate and the partition walls. As shown in FIG. 4, an abnormal sound of about 10 kHz generated in the prior art can substantially be decreased (by about 20 dB). Since a sound insulating member need not be provided on the front side of the front glass substrate 11, the optical film 31 can directly be bonded onto the front glass substrate and attempts to reduce the thickness, weight and cost of the panel can also be implemented.

Although the front glass substrate 11 and the back glass substrate 15 both are convexly curved in profile according to this embodiment of the invention, the same operation/working-effect will be achieved even though either of them is convexly curved in profile.

The invention is not limited to the above embodiment of the invention but applicable to a plasma display panel so configured as to have a raised dielectric layer (insulating partition walls). By this raised dielectric layer is meant that it is a protruded surface portion of the dielectric layer on an edge portion opposite to each discharge space in each display electrode 12 out of a pair of display electrodes forming display lines. The raised dielectric layer is intended to restrain electric discharge on the edge portion of the display electrode 12 and to prevent the interference of the discharge in the adjoining discharge spaces. The raised dielectric layer may be provided on the front glass substrate 11 and brought into contact with the partition walls 16 so as to define the dimension of the gap of each discharge space by the raised dielectric layer and the partition walls 16. As the additional effect of preventing the interference of the discharge in the adjoining discharge spaces is achievable, display quality is improved further.

As the invention is thus constituted, desired display characteristics and display quality are made obtainable by uniformizing the space between glass substrates and the generation of an abnormal sound is also preventable when the panel is driven without providing a sound insulating member. Moreover, it is unnecessary to provide the sound insulating member, so that the thickness, weight and cost of the display unit of the plasma display panel are reducible.

What is claimed is:

1. A flat plasma display panel comprising:
   a front substrate;
   a back substrate which faces the front substrate to define a space between the front substrate and the back substrate;
   a partition wall for defining a dimension of the space and partitioning the space into a plurality of discharge spaces;
   wherein peripheral portions of both the front substrate and the back substrate are sealed up with a sealing material so that at least one of the front substrate and the back substrate produces internal stress that attempts to curve the substrate in a manner that the peripheral portion of the substrate comes away from another substrate; and
   the sealing material contains granular substances having a melting point higher than that of the sealing material and having an outer diameter ranging from what is equal to the dimension of the space up to what is five times greater than the dimension of the space.

2. The flat plasma display panel according to claim 1, wherein an optical film is directly bonded onto the front side of the front substrate.

3. A method of producing a flat plasma display panel comprising the steps of:

forming a front panel by forming first panel components on a side of a front substrate;

wherein the front substrate is convexly curved in profile; and the first panel components are formed on a convex side of the front substrate;

forming a back panel by forming second panel components on a side of a back substrate;

wherein the back substrate is convexly curved in profile; and the second panel components are formed on a convex side of the back substrate;

stacking the front panel and back panel so that the first and the second panel components face one another;

reducing the front panel and the back panel to flat plates by sealing up the peripheral portions of the front panel and the back panel with the sealing material, the sealing material containing granular substances having a melting point higher than that of the sealing material and having an outer diameter ranging from a dimension of a discharge space and over, the discharge space to be defined between the front panel and the back panel; and one of the first components and the second components include a partition wall to define the dimension of the dimension of the discharge space.

4. The method of producing a plasma display panel according to claim 3, further comprising the step of directly bonding an optical film onto a front side of the front substrate.

* * * * *